United States Patent
Coleman et al.

(10) Patent No.: US 9,352,858 B2
(45) Date of Patent: May 31, 2016

(54) ANGLES-ONLY INITIAL ORBIT DETERMINATION (IOD)

(71) Applicant: Raytheon Company, Waltham, MA (US)

(72) Inventors: Gary D. Coleman, Redondo Beach, CA (US); John F. Silny, Playa Vista (CA)

(73) Assignee: Raytheon Company, Waltham, MA (US)

( * ) Notice: Subject to any disclaimer, the term of this patent is extended or adjusted under 35 U.S.C. 154(b) by 396 days.

(21) Appl. No.: 14/067,338

(22) Filed: Oct. 30, 2013

(65) Prior Publication Data

US 2015/0120096 A1 Apr. 30, 2015

(51) Int. Cl.
*B64G 3/00* (2006.01)
*B64G 1/24* (2006.01)

(52) U.S. Cl.
CPC . *B64G 3/00* (2013.01); *B64G 1/242* (2013.01)

(58) Field of Classification Search
CPC ............ B64G 1/24; B64G 1/242; B64G 3/00;
G01S 19/00; G01S 19/02; G01S 19/03;
G01S 19/24; G01S 19/243; G01S 19/25;
G01S 19/252; G01S 19/258; G01S 19/26;
G01S 19/27; G01S 19/28; G01S 19/31;
G01S 19/38; G01S 19/42; G01S 19/421;
G01S 19/423; G01S 19/425; G01S 19/426;
G01S 19/428; G01S 19/45; G01S 19/46;
G01S 49/47; G01S 19/48; G01S 19/49;
G01S 19/52; G01S 19/53
USPC ................................ 700/531; 244/158.4, 171
See application file for complete search history.

(56) References Cited

U.S. PATENT DOCUMENTS

| | | | | |
|---|---|---|---|---|
| 5,804,812 A | * | 9/1998 | Wicke | ..................... F41G 7/306 244/3.1 |
| 2004/0008137 A1 | * | 1/2004 | Hassebrock | ............. B64G 3/00 342/189 |
| 2009/0236422 A1 | * | 9/2009 | Kleder | .................. G01S 13/726 235/411 |
| 2011/0090116 A1 | * | 4/2011 | Hatch | ..................... G01S 19/40 342/357.59 |

OTHER PUBLICATIONS

Gooding; A new procedure for orbit determination based on three lines of sight (angles only); Defense Research Agency, Farnborough, UK; Technical Report 93004; 1993; pp. 1-42 + appendices.*
DeMars et al.; Initial Orbit Determination using Short-Arc Angle and Angle Rate Data; IEEE Transactions on Aerospace and Electronic Systems; vol. 48, No. 3; Jul. 2012; pp. 2628-2637.*

(Continued)

*Primary Examiner* — Stephen Holwerda
(74) *Attorney, Agent, or Firm* — Eric A. Gifford (57) ABSTRACT

A methodology for initial orbit determination of an object about an astronomical body searches a grid of possible boundary values on the range-to-object over the observation interval to find the grid point and corresponding initial orbit that best fits all of the more than three (N) angles-only observations according to an error metric. The search is conducted by solving a boundary-value problem for different grid points. The state vector is propagated to determine estimated observation directions for the remaining N−2 observations. The grid point (and initial orbit) that best fit all of the observations is selected. For efficiency, the search may start with a broad but coarse initial grid and increase the resolution of the grid as the search converges to a solution.

19 Claims, 7 Drawing Sheets

(56) References Cited

OTHER PUBLICATIONS

R.H. Gooding, "A New Procedure for Orbit Determination Based on Three Lines of Sight (Angles Only)," Defence Research Agency, Technical Report 93004, Apr. 1993.

R.H. Gooding, "A Procedure for the Solution of Lambert's Orbital Boundary-Value Problem," Celestial Mechanics and Dynamical Astronomy 48, pp. 145-165, 1990.

R.H. Gooding, "On the Solution of Lambert's Orbital Boundary-Value Problem," Royal Aerospace Establishment, Technical Report 88027, Apr. 1988.

R.H. Gooding, "On Universal Elements, and Conversion Procedures to and From Position and Velocity," Celestial Mechanics 44, (1988), pp. 283-298.

R.H. Gooding: "Procedures for Solving Kepler's Equation," Celestial Mechanics 38, (1986) pp. 307-334.

R.H. Gooding: "The Hyperbolic Kepler Equation (and the Elliptic Equation Revisited)," Celestial Mechanics 44 (1988), pp. 267-282.

\* cited by examiner

ANGLES-ONLY INITIAL ORBIT DETERMINATION (IOD)

BACKGROUND OF THE INVENTION

1. Field of the Invention

This invention relates to initial orbit determination (IOD) from angles-only observations. The basis of the methodology is to search a grid of possible boundary values on the range-to-object over the observation interval to find the grid point (by solution of a boundary-value problem such as Lambert's Problem) and initial orbit (orbital element set) that best fits all of the three or more observations according to an error metric.

2. Description of the Related Art

Determining an object's orbit about an astronomical body (e.g. the Earth, Sun, a minor planet, asteroid, etc.) from three line-of-sight (LOS) observations is one of the classical problems of orbit dynamics, being significantly more difficult than solving either of Kepler's equations or Lambert's problem. It resembles Lambert's problem (the derivation of a Keplerian orbit from positions at two given times) in its minimal nature, the difference being that we have two items of data (angles only) at three times instead of three items of data (angle and range) at two times. The greater complexity arises because details of the observers' locations must be available in the angles-only problem, whereas they are entirely irrelevant in Lambert's problem since absolute positions are known. A full characterization of this classic problem and the known solutions are provided by. R. H. Gooding "A New Procedure for Orbit Determination Based on Three Lines of Sight (Angles Only)" Defense Research Agency, 1993, which is excerpted herein and incorporated by reference.

To present the problem in its starkest form, we suppose that nothing is known about the hypothetical orbit, other than through the three observations, except the observed object can be assumed to have a Keplerian motion about a given astronomical body (force centre) having a gravitational strength. Thus all possible solutions are sought, the problem being usually described as one of 'initial' orbit determination or IOD. If an approximate orbit can be established from the minimal data available, then a more accurate orbit can be derived later, using as many observations as desired, but that would be an entirely different problem in which the techniques of linearization (relative to the initial orbit), least squares and differential correction can be applied. These techniques are irrelevant until a sufficiently accurate set or orbital parameters is available for differential correction to converge.

Classical solutions to the problem were devised by Laplace and Gauss some two centuries ago. These solutions assumed that orbits would be restricted to certain types and always heliocentric; only a relatively short arc of the orbit would be observed (e.g. a few degrees); observations would be effectively from a single site; and computing methods (e.g. a human) would be severely limited. The human computer did possess one advantage in that the human could improvise as necessary.

In more recent times, solutions that provide greater universality and robustness have been required to handle a wider variety of orbits, a wider range of observed arcs (a few degrees to multiple half-orbits), observations from multiple sites and more timely solutions. A modern restatement of the problem is to find a procedure that is capable of locating all solutions of an arbitrary 'general problem'; solutions should be determined in the shortest possible time, and to the maximum possible accuracy inherent in the data; intrinsic limitations, associated with some form of indeterminancy, should be recognizable; and there should be options to increase efficiency by the avoidance of solutions that are incompatible with any legitimate assumptions about the orbit. These solutions would have to be built into software of a computer to provide the universality, robust performance and timeliness required.

These factors dictated approaches based on the iteration of the estimated values of the ranges to the object, so called "range iteration" techniques. The current industry standard is the Gooding Initial Orbit Determination (IOD) procedure detailed in the 1993 Defense Research Agency report. The Gooding IOD procedure is part of the Orbit Determination Tool Kit (ODTK), a software package that can be added to the System Took Kit (STK). The ODTK combines both Gooding's IOD tool to determine an initial orbit and a Least Squares differential correction tool to improvide the initial orbit determination based on new angle-only observations.

Gooding's IOD procedure is based on a higher-order Newton correction of the assumed values for two of the three unknown ranges with a Lambert problem solution algorithm (such as Gooding's own solution to the Lambert Problem) at the heart of the procedure. Gooding estimates values for the first and third unknown ranges and solves Lambert's problem to determine a state vector for an initial orbit. The state vector is converted into a universal orbital element set such as (a, e, i, $\Omega$, $\omega$, $\nu$), where a is the semi-major axis of the ellipse, $e=SQRT(1-b^2/a^2)$ where b is the semi-minor axis is its eccentricity, and the four angles i (inclination), $\Omega$ (longitude of ascending node), $\omega$ (argument of perigee), and $\nu$ (true anomaly) uniquely define the orientation of the orbit. Parameters $\alpha$ ($\alpha=\mu/a$ where $\mu$ is the gravitational parameter of the Earth) and perigee range $q=a*(1-e)$ may be substituted for a and e. The orbit is propagated to estimate target locations for the second observation. A difference angle between the measured and estimated observation direction is computed. A range step size is determined and used to adjust the first and third estimated ranges. Derivatives of the difference angle are computed with respect to the estimated ranges. Either Halley's method or Newton-Raphson methods of iteration are used to find a local maximum in a search plane. The step-size is reduced and process of computing the derivatives and iterating is repeated until convergence is achieved or the algorithm fails to converge.

Gooding's IOD procedure was specifically configured for the case in which the satellite had completed an unknown number of half-orbits tracing an arc of 180 degrees or more. In these cases Gooding's IOD procedures converges rapidly to a local maximum in approximately 99.9% of the cases. However, when applied to cases in which the satellite traces a small arc of only a few degrees Gooding's IOD procedure may converge in less than approximately 60% of the cases. Approximately 40% of the time Gooding's procedure either failed to converge or converged to a non-physical orbit (e.g. one that escaped Earth orbit or one that intersected Earth orbit).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention describes a methodology for initial orbit determination (IOD) of an object about an astronomical body using three or more (N) angles-only observations. The basis of the methodology is to search a grid of possible boundary values on the range-to-object over the observation interval to find the grid point and corresponding initial orbit that best fits all of the observations according to an error metric. The search is conducted by solving a boundary-value problem (e.g. Lambert's Problem) for different grid points. The state vector is propagated to determine estimated observation directions for the remaining N−2 observations. The grid point (and initial orbit) that best fit all of the observations is selected. The best fit is suitably determined by an error metric between the measured and estimated observation directions for the remaining N−2 observations. The orbital element set corresponding to the selected grid point that describes the object's initial orbit is reported out. The grid may be searched by testing each and every point on the grid or by using other optimization techniques such as hill climbing algorithms to find the optimal grid point. For efficiency, the search may start with a broad but coarse initial grid and increase the resolution of the grid as the search converges to a solution.

To further improve search efficiency, the methodology may use values of orbital element parameters to reject initial orbits that are invalid. For example, the perigee range q may be used to reject orbits that pass through the astronomical body and the eccentricity e may be used to reject orbits that escape orbit about the astronomical body. The method may smooth the error metric over the search grid prior to selecting the best-fit grid point to reduce the influence of noise.

The methodology is particularly useful to determine an initial orbit when the observation arc is limited to a few degrees and when greater than 3 observations are available. In an embodiment, over 100 observations are made over an arc of 5 degrees or less and processed to determine an initial orbit.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a methodology for initial orbit determination using three or more (N) angles-only observations. The basis of the methodology is to search a grid of possible boundary values on the range-to-object over the observation interval to find the grid point and corresponding initial orbit that best fits all of the observations according to an error metric. The search is conducted by solving a boundary-value problem such as Lambert's Problem for different grid points. The state vector is propagated to determine estimated observation directions for the remaining N−2 observations. The grid point (and initial orbit) that best fit all of the observations is selected. The best fit is suitably determined by an error metric between the measured and estimated observation directions for the remaining N−2 observations. The grid may be searched by testing each and every point on the grid or by using other optimization techniques such as hill climbing algorithms to find the optimal grid point. For efficiency, the search may start with a broad but coarse initial grid and increase the resolution of the grid as the search converges to a solution. To further improve search efficiency, the methodology may use values of orbital element parameters to reject initial orbits that are invalid. For example, the perigee range q may be used to reject orbits that pass through the astronomical body and the eccentricity e may be used to reject orbits that escape orbit about the astronomical body. In other cases, these may represent valid orbits. The method may smooth the error metric over the search grid prior to selecting the best-fit grid point to reduce the influence of noise.

The present methodology and the Gooding IOD procedure are similar in that both are range-iteration algorithms and both solve a boundary-value problem (e.g. the Lambert Problem) at their core. The two approaches differ in the number of observations that can be processed and how those observations are processed to find a solution. The Gooding IOD procedure is an analytic solution that is limited to processing exactly 3 observations. Gooding estimates values for the first and third unknown ranges and solves Lambert's problem to determine a state vector for an initial orbit. The present methodology can process 3 or more observations (preferably and typically many more than 3) and employs an error metric to find an initial orbit that best fits all of the observations. The present methodology is robust for large arcs greater than 180 degrees, moderate arcs<180 degrees and small arcs<5 degrees. Simulations have demonstrated convergence 99.9% of the time for small arcs. The present methodology provides a robustness for the "small arc" problem not demonstrated by any of the prior art techniques; not Gauss, Laplace or Gooding.

Figure 1:
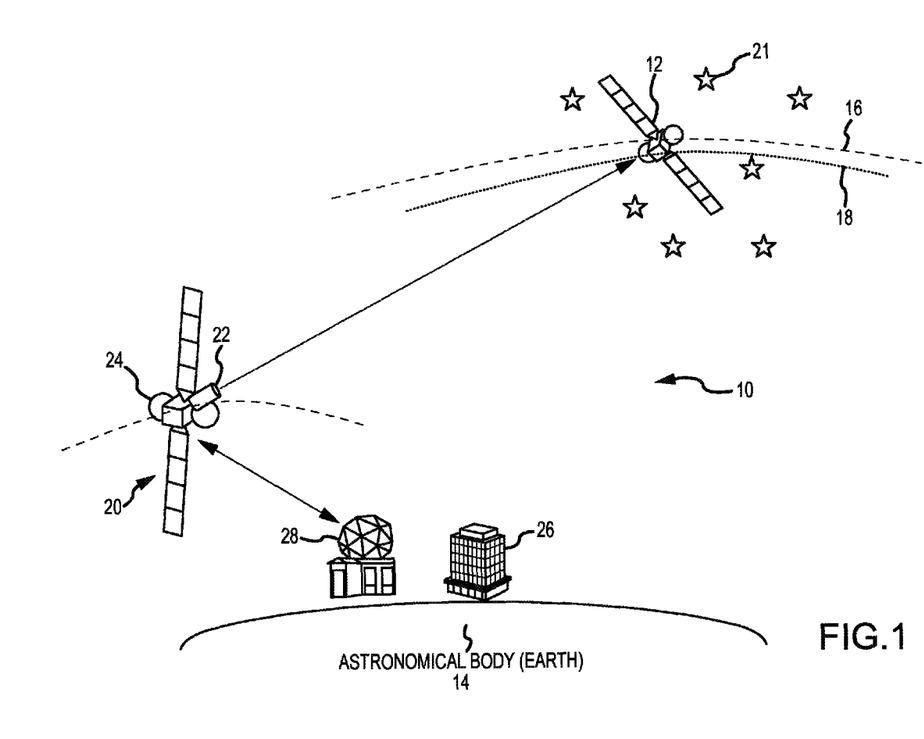
FIG. 1 is a diagram of an embodiment of an observation platform for determining an object's initial orbit about an astronomical body from three or more angle-only measurements.

Referring now to the drawings, an embodiment of a system 10 for initial orbit determination (IOD) of an object 12 about an astronomical body 14 (e.g. Earth) is depicted in FIG. 1. Object 12 follows an orbit 16 about astronomical body 14. In most cases, object 12 orbits around astronomical body 14. In some cases such as with ICBMs, the orbit 12 may pass through astronomical body 14. In other cases such as Voyagers 1 and 2 and other interplanetary probes, the orbit 12 may escape orbit about the astronomical body. The IOD methodology for each case is the same. However, if there is a priori knowledge of the orbit, invalid orbits may be eliminated.

The present methodology measures n angle-only observation directions $d_{o1}$, $d_{o2}$, . . . $d_{on}$ of the object at times $t_1$, $t_2$, . . . , $t_n$, where n is three or more, from known observation positions $o_1$, $o_2$, . . . $o_n$ and uses all of the n angle-only observations to determine an initial orbit 18 that approximates true orbit 16. The observations may be made from a fixed observation position on the astronomical body 14 or one or more platforms 20 in orbit about the astronomical body 14. Observation of the fixed stars 21 may provide a coordinate system in which to measure the relative positions of object 12.

One or more sensors 22 may be mounted on the one or more platforms 20 to measure the n angle-only observations directions over an observation interval. In an embodiment, a side-staring sensor increases access to objects (e.g. satellites) in GEO. In another embodiment, a pushbroom sensor offers frequent ubiquitous coverage from LEO to beyond GEO. Processing of the n angle-only observations may be performed by computers 24 on-board the platform(s) and/or computers 26 co-located with a ground receive antenna 28.

In different embodiments, the IOD methodology may measure 3 or more observations directions within an observation interval that spans a small arc of less than 5 degrees, an intermediate arc between 5 and 180 degrees or a large arc greater than a half-orbit of 180 degrees and possibly multiple half-orbits. In an embodiment, a platform is provided with a sensor having a field-of-view approximately 5 degrees wide and 1 degree long. The sensor operates in time delay integration (TDI) mode so that the stars are frozen in the image and the moving object forms a streak across the image. The sensor provides 4 observations of the object entering, crossing and leaving the FOV. Simulations have demonstrated that adding simply a $4^{th}$ observation for the small arc greatly improved convergence to the global solution of the initial orbit. In another embodiment, dozens of platforms are provided with hundreds of sensors to provide well over a hundred observation directions within the small arc.

Figure 2:
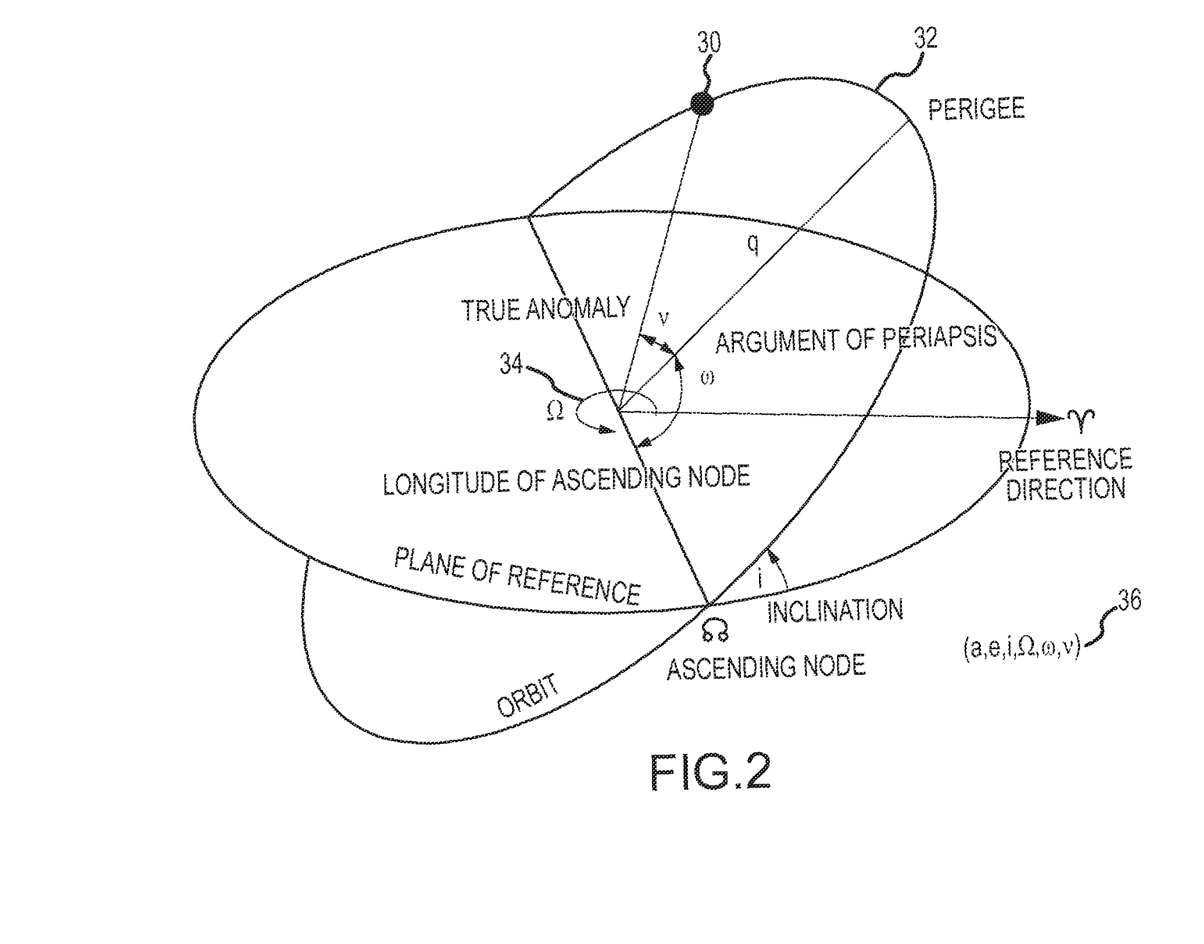
FIG. 2 is a diagram of an orbit of an object about an astronomical body and a universal orbital element set that uniquely describes the orbit.

Referring now to FIG. 2, object 30 follows an orbit 32 according Keplerian motion about a given astronomical body 34 (force centre) having a gravitational strength. Orbit 32 is uniquely described by a universal orbital element set 36 such as (a, e, i, $\Omega$, $\omega$, $\nu$), where a is the semi-major axis of the ellipse, $e=SQRT(1-b^2/a^2)$ is its eccentricity where b is the semi-minor axis, and the four angles i (inclination), $\Omega$ (longitude of ascending node), $\omega$ (argument of perigee), and $\nu$ (true anomaly) uniquely define the orientation of the orbit. Parameters $\alpha$ ($\alpha=\mu/a$ where $\mu$ is the gravitational parameter of the Earth) and perigee range $q=a*(1-e)$ may be substituted for a and e. The parameters a and e or $\alpha$ and q are parameters that define the size and shape of the orbit, but only q is shown in the drawing to reduce clutter. The eccentricity e is a ratio, which would be difficult to show and is therefore not shown, while $\alpha$ has units of velocity squared and cannot be shown directly.

Figure 3:
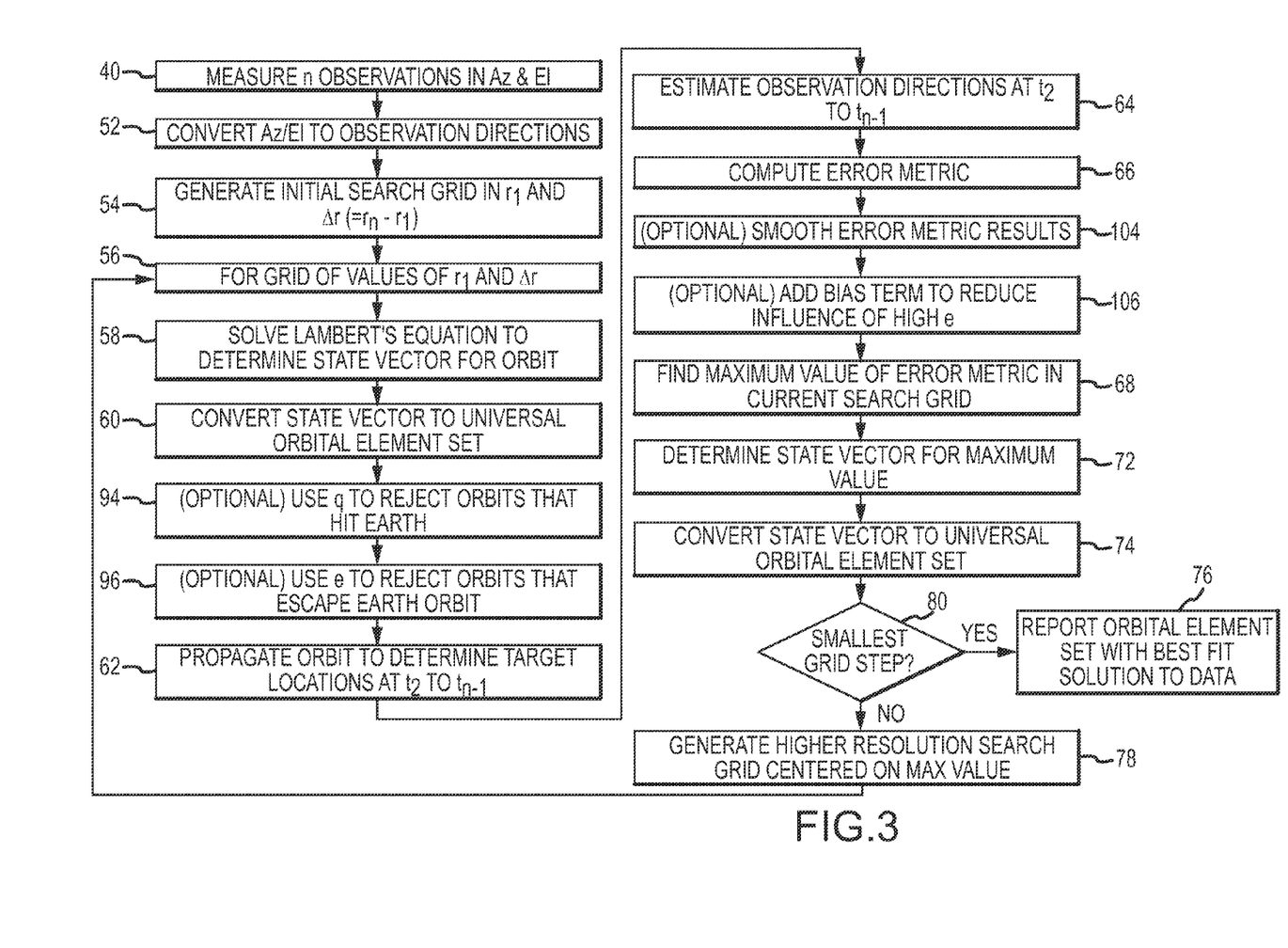
FIG. 3 is an embodiment of a flow diagram of the methodology for processing all of the N angle-only observations to determine the initial orbit.
Figure 4:
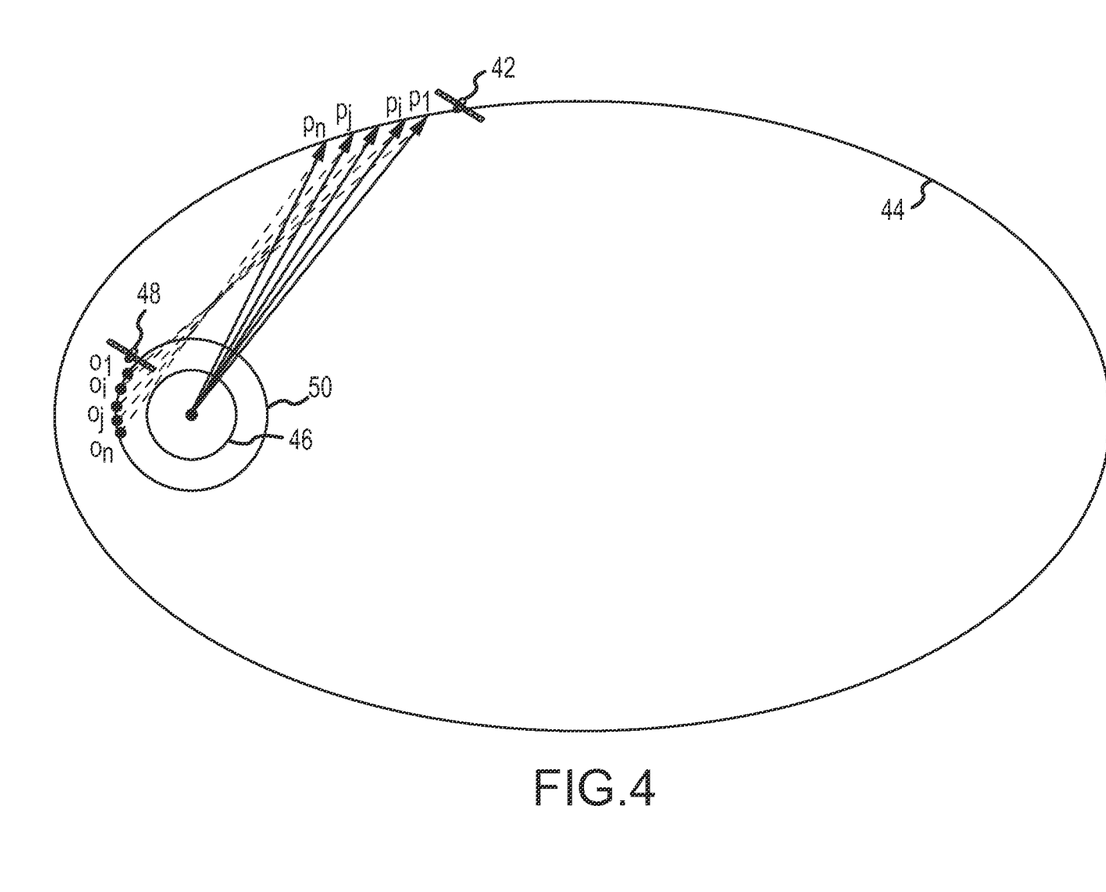
FIG. 4 is a diagram of N angle-only measurements of the object as it orbits the astronomical body.

Referring now to FIGS. 3-7, an embodiment of the IOD methodology for determining an object's initial orbit about an astronomical body comprises, from known observation positions $o_1$, $o_2$, ... $o_n$, measuring n angle-only observation directions $d_{o1}$, $d_{o2}$, ... $d_{on}$ of the object at times $t_1$, $t_2$, ... $t_n$ where n is three or more (step 40). As shown in FIG. 4, an object 42 such as a satellite follows an orbit 44 around the Earth 46. The measurements of angle-only observation directions are made from a platform 48 such as another satellite in an orbit 50 about the Earth. The $p_i$ represent positions of the object, the dashed line as are observation directions with range and the solid lines are ranges of the object from Earth center. Measurement of the n angle-only observation directions may comprise first measuring azimuth and elevation angles to the object and then converting the azimuth and elevation angles to unit vectors in an Earth Centered Earth Fixed (ECEF) coordinate system that form the observation directions (step 52).

The methodology generates a search grid in $r_i$ and $\Delta r=r_j-r_i$ with a sampling resolution where $r_i$ and $r_j$ are a range-to-object of the different $i^{th}$ and $j^{th}$ observations (step 54). The $i^{th}$ observation is suitably the $1^{st}$ observation and the $j^{th}$ observation is suitably the $n^{th}$ observation. The initial search grid is suitably selected to span all reasonable orbits for the application of closed orbits around the astronomical orbit, here the Earth with a coarse grid sampling to reduce computational load. For an embodiment, a minimum for $r_1$ of 0 km is set with $\Delta r$ set at 500 km. A grid size of 151×151 elements is selected with a maximum of r1 equal to 75,000 km. The initialization of the search grid will be determined by a priori information about the object and its orbit.

For different combinations of $r_i$ and $\Delta r$ e.g. all points on the grid (step 56), the methodology solves a boundary-value problem as a function of ($o_i$, $o_j$), ($d_{oi}$, $d_{oj}$) ($r_i$, $\Delta r$) to determine a state vector of a three-dimensional position and a velocity of the object at time $t_i$ (step 58). In an embodiment, the methodology solves Lambert's Orbital Boundary-Value Problem. Lambert's Problem is the boundary value problem for celestial mechanics, and is defined for the 3 spatial coordinates of the object at 2 specific times.

Lambert's problem may be defined as follows: an (unperturbed) orbit, around a given inverse-square-law center of force, C, is to be found connecting two given points $P_1$ and $P_2$, with a flight time $\Delta t$ ($=t_2-t_1$) that is known. That is, given the differential equation $$\ddot{\bar{r}} = -\mu \cdot \frac{\hat{r}}{r^2},$$

solve for $\bar{r}(t)$ where $\bar{r}(t_1)=\bar{r}_1$ and $\bar{r}(t_2)=\bar{r}_2$. The problem must always have at least one solution or orbit, although that solution may be "non-physical", requiring the object to travel faster than the speed of light or to pass through the central object, such as the Earth or Sun. In cases where $\Delta t$ is large, there may be multiple solutions, involving the object orbiting in different directions and completing one or more half-revolutions. Lambert's problem has no direct analytical solution, but several algorithms exist that iteratively converge to find one or all possible solutions. (Gooding, *A Procedure for the Solution of Lambert's Orbital Boundary-Value Problem*, Celestial Mechanics and Dynamical Astronomy, Vol. 48, pp. 145-165, 1990.)

The Initial Orbit Determination problem that we are solving is an optimization problem that uses an objective function that is evaluated using outputs from Lambert's problem. A given pair of estimates of the range at times $t_1$ and $t_2$ provides all the information needed to solve Lambert's problem. That is, we now have $\bar{r}(t)$, a predicted 3-dimensional position for the object at all times. (Since all of our other measurements are between $t_1$ and $t_2$, we don't actually need to use the solution for values of t outside of this range.) For our Initial Orbit Determination problem, we can work with a solution in either of two equivalent forms: a) a set of 6 orbital elements that can be used with Kepler's equation to propagate the orbit forward (or backward) in time, or b) an initial orbit state that gives x, y, z, $v_x$, $v_y$, and $v_z$ at a specific time or epoch, which can be used as a starting point for integration of the differential equation listed above.

The methodology propagates the position and velocity of the object provided by solving Lambert's problem to estimate observation directions $d_{e1}$, $d_{e2}$, ... $d_{en}$ at times $t_k$ for k=1 to n, k not equal to i or j. In an embodiment, this step comprises converting the state vector to a universal orbital element set such as (a, e, i, $\Omega$, $\omega$, $\nu$) (step 60), propagating the orbit uniquely defined by the universal orbital set to determine target locations at $t_2$ to $t_{n-1}$ (step 62) and estimating observation directions at $t_2$ to $t_{n-1}$ (step 64).

The methodology computes an error metric between the measured observation directions $d_{o1}$, $d_{o2}$, ... $d_{on}$ and estimated observation directions $d_{e1}, d_{e2}, \ldots d_{en}$ at times $t_k$ for k=1 to n, k not equal i or j (step 66). The error metric needs to measure how closely the estimated observations directions match the observed ones over the entire set of observations. The error metric should result in the largest score when all estimates perfectly match the observations, degrade symmetrically when any estimate is off along any axis, not degrade so quickly or so slowly that there is no local slope defining in which direction to move to improve the score, and not rely on parameters or other information which might not be available. It is also useful if there is a theoretical reason for the metric. The Chi-squared statistic meets many of these desired properties, but it assumes an estimate of the measurement uncertainty that might not be available. The error metric used in most of the trial runs is a logarithmic transformation of the RMS angle error between the estimates and the observations, clipped to a maximum value of 20. To be more specific, $$\text{score} = {}^{n-2}\sqrt{\Pi_2^{n-1} \min[20, -\log_{10}((\widehat{de}_i - \overline{do}_i{}^2)]}$$

Other forms of this or related metrics are clearly possible; this is just one example of a useful metric. The methodology identifies the ($r_i$, $\Delta r$) pair on the search grid at which the error metric represents a best fit to the measured observation directions (e.g. a maximum value of the Chi-squared statistic) (step 68).

Figures 5A, 5B:
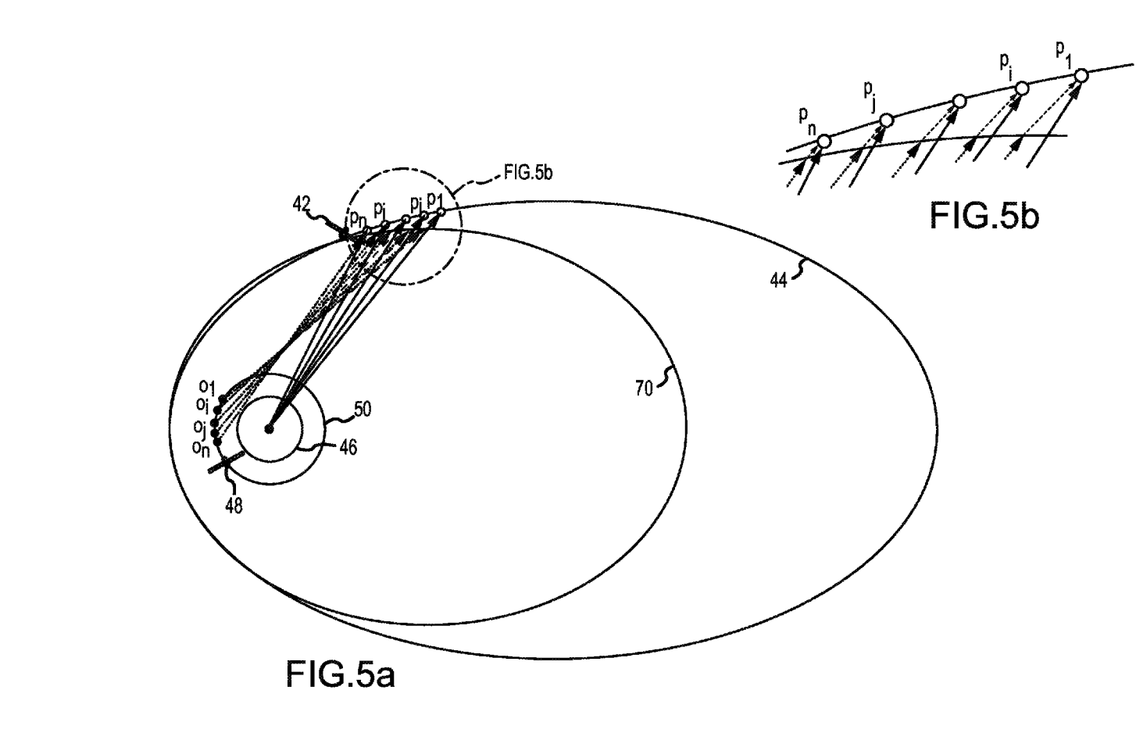
FIGS. 5a and 5b are diagrams of the N angle-only measurements and estimates for forming the error metric to select the initial orbit.
Figure 6A:
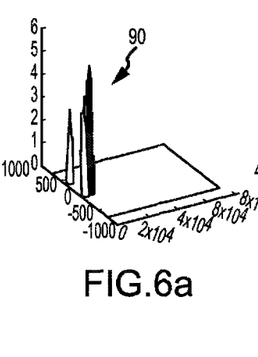
FIGS. 6a through 6h are a sequence of plots of the error metric at finer and finer resolution about the ($r_i$, $\Delta r$) pair on the search grid corresponding to the orbital element set for the initial orbit.
Figure 6B:
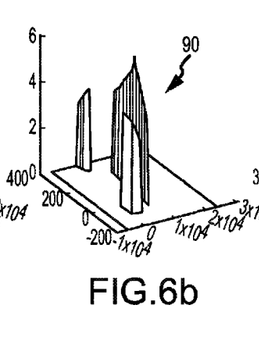
Figure 6C:
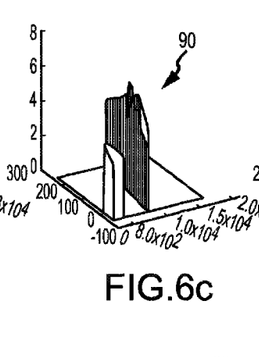
Figures 6D, 6H:
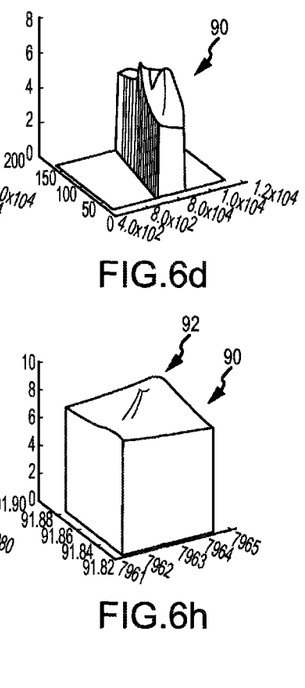
Figure 6E:
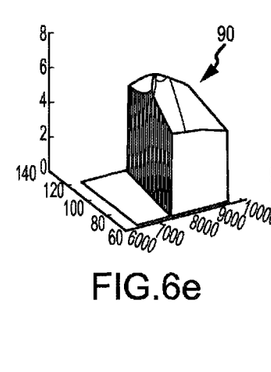
Figure 6F:
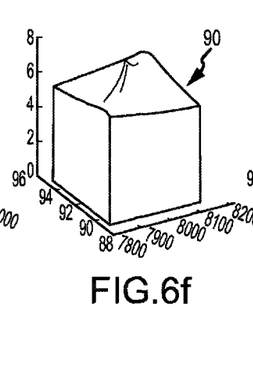
Figure 6G:
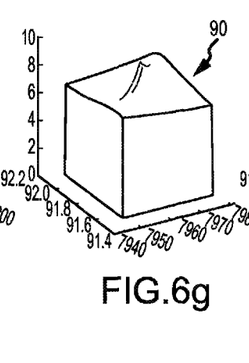

The methodology reports an orbital element set corresponding to the identified ($r_i$, $\Delta r$) pair that describes the object's initial orbit 70 as shown in FIGS. 5a and 5b. $p_i$ represent positions of the object, the dashed lines are observation directions with range, the solid lines are ranges of the object from Earth center and the dotted lines are estimated observation directions with range. In an embodiment, this step comprises determining a state vector for the ($r_i$, $\Delta r$) pair that has the maximum value for the Chi-squared statistic (step 72), converting the state vector to a universal orbital element set (step 74) and reporting out the orbital element set (step 76).

In theory the search could be conducted on a single very large high-resolution grid. For computational efficiency another approach is to generate an initial search grid in step 54 that spans a large range-to-object with a coarse grid resolution. At each iteration, the methodology generates a higher resolution search grid that is centered on the ($r_i$, $\Delta r$) pair with the maximum value from the previous iteration (step 78). The total size of the search grid may remain fixed. For example, doubling the grid resolution reduces the search area by half. In an embodiment, the resolution is increased by 2, 2 and 2.5 every 3 iterations to affect a 10× zoom. The process may repeat until the small grid step has been evaluated (step 80) at which point the methodology reports out the orbital element set with the best fit solution to the data (step 76).

For the first few iterations, it may be extremely important to perform a brute force search, that is, to evaluate every grid point. This is especially important if the optional constraints (discussed below) are being imposed, as there may be parts of the grid for which orbits exist but are isolated from other viable orbits. Once a single contiguous region of potential orbits has been isolated, and the search grid has decreased to concentrate on that region, then hill-climbing algorithms can be effectively used. For a case with many observations, the error function topography is expected to be complex, with multiple local maxima in addition to the global maximum, and the relative values of these maxima may change as the grid scale changes, so any hill-climbing search algorithm should consider multiple starting points near each local maximum that can be identified in a brute-force grid search at the final resolution for that approach.

FIGS. 6a through 6h plot the Chi-squared error statistic 90 over the search grid for successive iterations. In this example, the zoom is 2, 2, 2.5, 2, 2, 2.5, 2 and 2. At each iteration, the grid is re-centered around the ($r_i$, $\Delta r$) pair with the maximum value from the previous iteration. Upon termination of the search, the ($r_i$, $\Delta r$) pair with the maximum value 92 is used to find the orbital element set to define the initial orbit.

Figure 7:
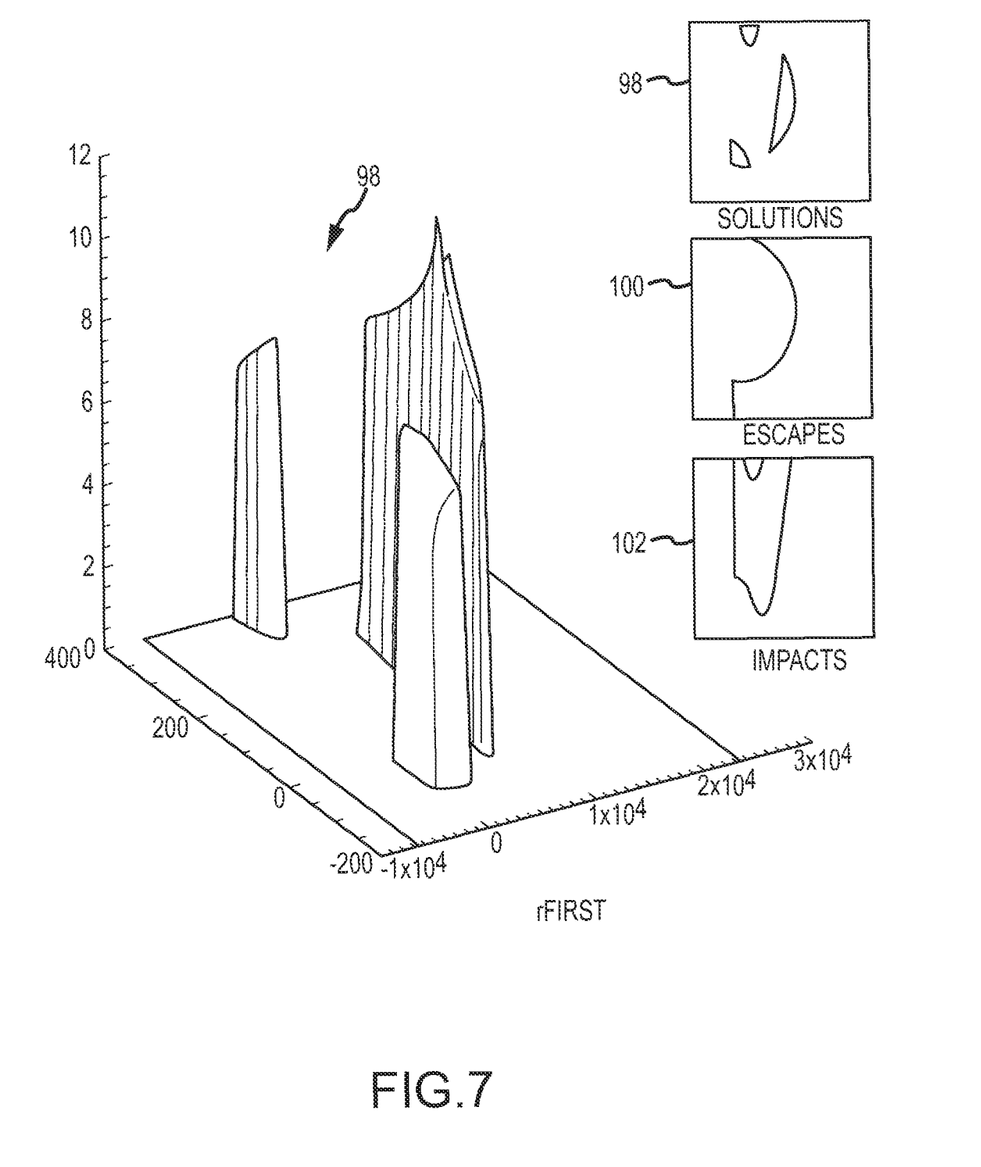
FIG. 7 is a plot of the error metric the use of the "q" and "e" parameters of the orbital element set to exclude non-viable orbits.

Optional constraints may be added to the methodology to increase search efficiency. The methodology may use values of orbital element parameters to reject initial orbits that are invalid. For example, the perigee range q may be used to reject orbits that pass through the astronomical body (step 94) and the eccentricity e may be used to reject orbits that escape orbit about the astronomical body (step 96). In many cases it would be known a priori that such orbits are invalid for the current application In other cases, these may represent valid orbits. As shown in FIG. 7, which is a replica of FIG. 6b, a solution space 98 of valid orbits is represented by overlapping the set of orbits 100 that escape and the set of orbits 102 that impact with the astronomical body. The orbits that neither escape nor impact define the solution space 98 of valid orbits.

The method may smooth the error metric over the search grid (step 106) prior to selecting the best-fit grid point to reduce the influence of noise. One simple approach is to convolve the computed error metric with a small (3×3) weighting kernel, where each output value is the weighted sum of its original value and that of its eight closest neighbors.

The method may add a bias term to the error metric to reduce the influence of high eccentricity e. High eccentricity orbits are unusual, so adding the bias term can keep the search from narrowing in the search in the wrong region when the search grid is still coarse.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of determining an object's initial orbit about an astronomical body, comprising:

receiving n angle-only observation directions ($d_{o1}, d_{o2}, \ldots d_{on}$) of the object at times ($t_1, t_2, \ldots, t_n$) where n is greater than three, said angle-only observation directions measured using one or more angle-only sensors from known observation positions ($o_1, o_2, \ldots, o_n$), on one or more platforms; and one or more computer processors configured to execute the steps of:

generating a search grid in $r_i$ and $\Delta r = r_j - r_i$ with a sampling resolution where $r_i$ and $r_j$ are a range-to-object of the different $i^{th}$ and $j^{th}$ observations;

for different combinations of $r_i$ and $\Delta r$, solving a boundary-value problem as a function of ($o_i$, $o_j$), ($d_{oi}$, $d_{oj}$) ($r_i$, $\Delta r$) to determine a state vector of a three-dimensional position and a velocity of the object at time $t_i$;

converting the state vector to an orbital element set that describes the object's initial orbit including elements of semi-major axis a, eccentricity e, inclination i, longitude of ascending node $\Omega$, argument of perigee $\omega$, and true anomaly v;

using Kepler's equation to compute the true anomaly v at times $t_k$ for k=1 to n, k not equal i or j for the remaining n−2 observations to propagate the orbit;

using the resulting orbital element sets of the propagated orbit to estimate object locations at times $t_k$ for k=1 to n, k not equal i or j;

computing estimated observation directions ($d_{e1}$, $d_{e2}$, ... $d_{en}$) from the known observation positions ($o_1$, $o_2$, ... $o_n$) to the estimated object locations at $t_k$ for the remaining n−2 observations; and computing an error metric based solely on the differences between the measured and estimated observation directions at times $t_k$ for the remaining n−2 observations;

identifying the ($r_i$, Δr) pair on the search grid at which the error metric represents a best fit to all of the measured observation directions; and reporting an orbital element set corresponding to the identified ($r_i$, Δr) pair that describes the object's initial orbit.

2. The method of claim 1, wherein the change in angle between observation direction $d_{oi}$ and $d_{on}$ is less than 180 degrees.

3. The method of claim 1, wherein the change in angle between observation direction $d_{oi}$ and $d_{on}$ is less than 5 degrees.

4. The method of claim 3, wherein the number of measured observation directions n is greater than one hundred.

5. The method of claim 1, wherein measuring the n angle-only observation directions comprises first measuring azimuth and elevation angles to the object and then converting the azimuth and elevation angles to unit vectors in an Earth Centered Earth Fixed (ECEF) coordinate system that form the observation directions.

6. The method of claim 1, wherein the $i^{th}$ observation is the $1^{st}$ observation and the $j^{th}$ observation is the $n^{th}$ observation.

7. The method of claim 1, further comprising:

computing a value of perigee range q from the values for the semi-major axis a of the ellipse and the eccentricity e;

using the value of perigee range q to reject orbits that pass through the astronomical body.

8. The method of claim 1, further comprising:

using a value of eccentricity e to reject orbits that escape orbit about the astronomical body.

9. The method of claim 1, wherein the error metric is based on a chi-squared statistical test for the differences between the remaining n−2 measured and predicted observation directions.

10. The method of claim 1, further comprising applying a smoothing filter to the error metric over the search grid prior to identifying the ($r_i$, Δr) pair.

11. The method of claim 1, further comprising adding a bias term to the error metric equal to one or more of the parameters from the orbital element set multiplied by respective scale factors.

12. The method of claim 1, wherein the search grid is searched for all combinations of $r_i$ and Δr.

13. The method of claim 12, the search grid is regenerated at least once about the identified ($r_i$, Δr) pair with a finer sampling resolution and the method is repeated for different combinations of $r_i$ and Δr.

14. The method of claim 1, the search grid is regenerated at least once about the identified ($r_i$, Δr) pair with a finer sampling resolution and the method is repeated for different combinations of $r_i$ and Δr.

15. The method of claim 1, further comprising storing the reported orbital element set as part of a database of tracked objects.

16. The method of claim 1, wherein the boundary-value problem is Lambert's Orbital Boundary-Value Problem.

17. The method of claim 1, wherein the sensors integrate over time to measure the angle-only observations directions from space-based platforms.

18. A method of determining an object's initial orbit about an astronomical body, comprising:

receiving n angle-only observation directions ($d_{o1}$, $d_{o2}$, ... $d_{on}$) of the object at times ($t_1, t_2, \ldots, t_n$) where n is greater than three, said angle-only observation directions measured using one or more angle-only sensors from known observation positions ($o_1, o_2, \ldots o_n$), on one or more platforms; and one or more computer processors configured to execute the steps of:

generating a search grid in $r_i$ and $\Delta r = r_j - r_i$ with a sampling resolution where $r_i$ and $r_j$ are a range-to-object of the different $i^{th}$ and $j^{th}$ observations;

for different combinations of $r_i$ and Δr, solving a boundary-value problem as a function of ($o_i$, $o_j$), ($d_{oi}$, $d_{oj}$) ($r_i$, Δr) to determine a state vector of a three-dimensional position and a velocity of the object at time $t_i$;

converting the state vector to an orbital element set that describes the object's initial orbit;

using a value of perigee range q to reject orbits that pass through the astronomical body;

using a value of eccentricity e to reject orbits that escape orbit about the astronomical body;

using Kepler's equation to propagate the orbit to estimate object locations at times $t_k$ for k=1 to n, k not equal i or j for the remaining n−2 observations;

computing estimated observation directions ($d_{e1}$, $d_{e2}$, ... $d_{en}$) from the known observation positions ($o_1$, $o_2$, ... $o_n$) to the estimated object locations at $t_k$ for the remaining n−2 observations; and computing an error metric between the measured and estimated observation directions at times $t_k$ for the remaining n−2 observations;

identifying the ($r_i$, Δr) pair on the search grid at which the error metric represents a best fit to all of the measured observation directions;

regenerating the search grid at least once about the identified ($r_i$, Δr) pair with a finer sampling resolution and the method is repeated for different combinations of $r_i$ and Δr; and reporting an orbital element set corresponding to the identified ($r_i$, Δr) pair that describes the object's initial orbit.

19. The method of claim 18, wherein the sensors integrate over time to measure the angle-only observation directions from space-based platforms.

* * * * *